Jan. 2, 1934.       R. G. LORRAINE       1,942,065
METHOD OF AND INSTRUMENT FOR MEASURING SURGE CURRENTS
Filed April 26, 1933    2 Sheets-Sheet 1
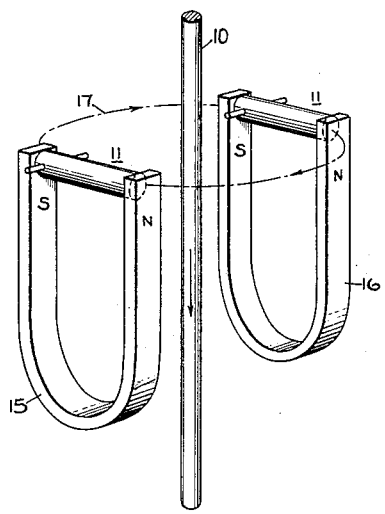
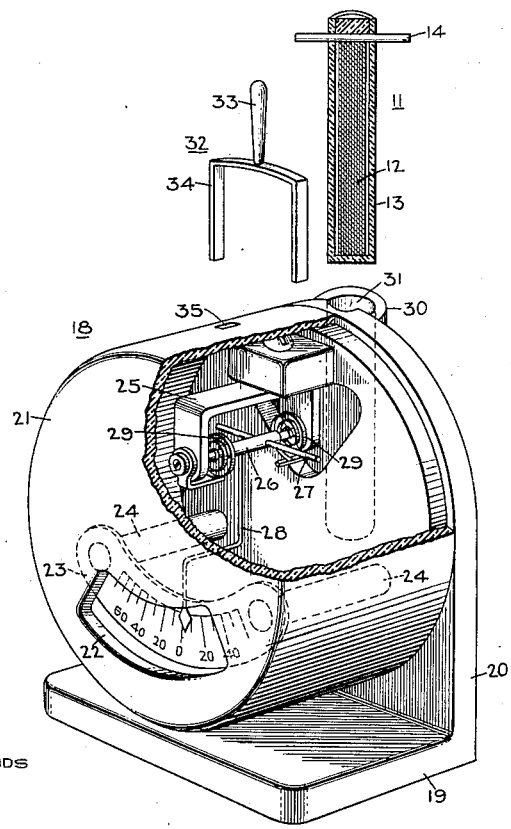
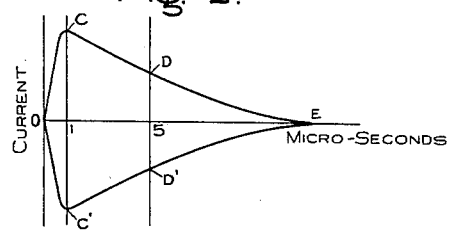
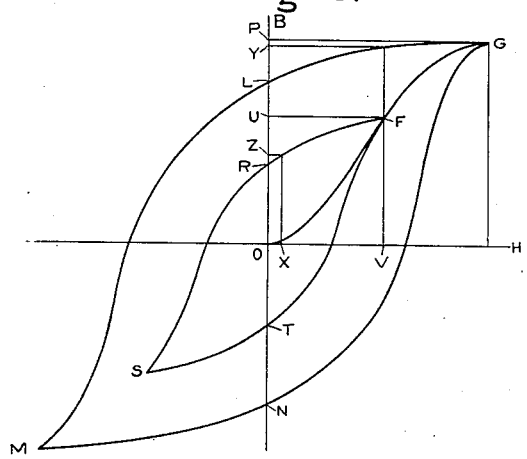
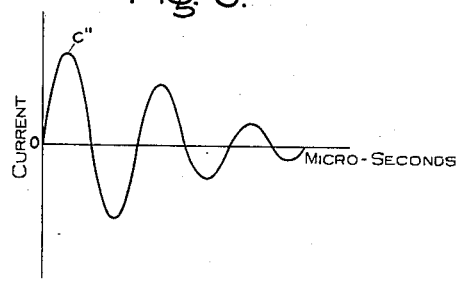
Inventor:
Richard G. Lorraine,
by Charles E. Mullan
His Attorney.

Jan. 2, 1934.     R. G. LORRAINE     1,942,065
METHOD OF AND INSTRUMENT FOR MEASURING SURGE CURRENTS
Filed April 26, 1933     2 Sheets-Sheet 2
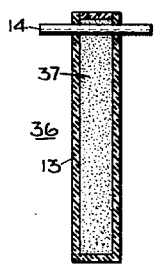
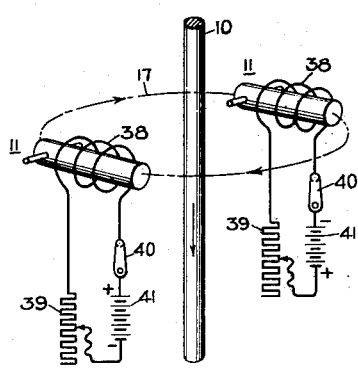
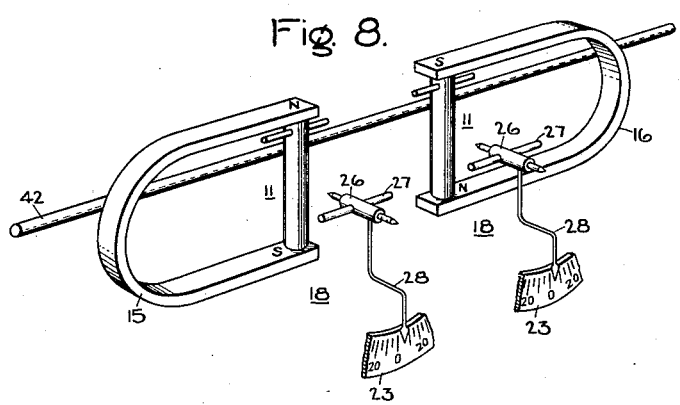
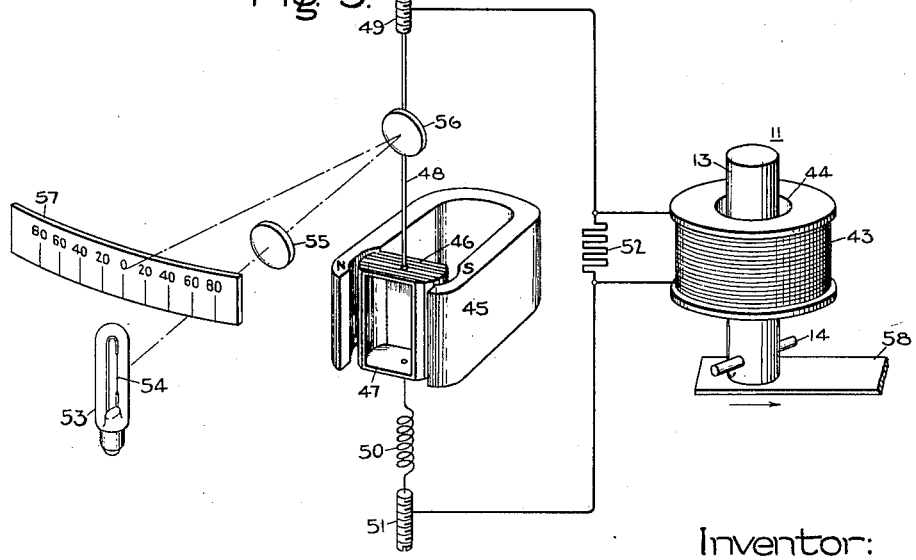
Inventor:
Richard G. Lorraine,
by Charles E. Mullen
His Attorney.

Patented Jan. 2, 1934

1,942,065

UNITED STATES PATENT OFFICE 1,942,065

METHOD OF AND INSTRUMENT FOR MEASURING SURGE CURRENTS

Richard G. Lorraine, Scotia, N. Y., assignor to General Electric Company, a corporation of New York Application April 26, 1933. Serial No. 668,063

12 Claims. (Cl. 175—183)

My invention relates to surge current measurements. The principal object of my invention is to provide a method of and an instrument for measuring the maximum value of an electric current surge that flowed through a conducting body irrespective of the nature and duration of the surge, the indication to remain visible after the surge is over. Another important object of my invention is to provide a method of and an instrument for investigating various characteristics of an electric current surge that flowed through a conducting body.

In U. S. patent application Serial No. 644,504, C. M. Foust and H. P. Kuehni, filed November 26, 1932, and assigned to the assignee of this application, there is illustrated and described a method of and several embodiments of an instrument for measuring the maximum value of an electric current surge that flowed through a conducting body. A brief description of the principle underlying the invention disclosed in the above-referred to copending patent application will be helpful in understanding the necessities for and advantages of the invention forming the subject matter of this patent application. This underlying principle consists of so placing a magnetic body possessing a high degree of magnetic retentivity adjacent the conductor through which the current surge flows that it becomes magnetized by the magnetic flux surrounding the conductor during the surge. The magnitude of the magnetic flux retained by this magnetic body after the current surge is over is a function of the maximum value of the surge current, and this flux magnitude is then measured by an instrument which is suitably calibrated with this magnetic body, thus obtaining an indication of the maximum value of the surge current. Accurate measurements can be obtained in this manner of the maximum value of an unidirectional current surge, but not of an oscillatory current surge unless the last alternation thereof has the maximum amplitude, this, however, being a rare case. When successive alternations of an oscillatory surge have different maximum values, the magnetic flux retained by the magnetic body at the end of one alternation is either increased or decreased during the next alternation, and at the end of the surge the magnitude of the magnetic flux retained by the magnetic body is a function of the maximum value of the surge current during the last alternation. In practically all oscillatory surges the maximum surge current does not occur during the last alternation of the surge, hence the apparatus described in the aforesaid copending patent application is unable to measure accurately the maximum value of practically all oscillatory surge currents.

Oscillatory current surges whose succeeding alternations have decreasing maximum values until the steady state operating condition is reached are a common occurrence in the electrical art. A well-known example is the inrush current to alternating current apparatus such as transformers and motors when they are first connected to their source of current. On the other hand, there are cases where a current surge may be unidirectional or oscillatory. For example, a flashover of the transmission line insulators supported by a transmission tower arm due to a lightning discharge or a switching operation may cause a unidirectional or an oscillatory current surge through the tower arm. Also a lightning stroke discharging through a transmission tower or a lightning arrester may cause a unidirectional or an oscillatory surge through the tower or lightning arrester. It is frequently desirable to measure the maximum value of the surge current through the tower, tower arm, or lightning arrester, as the case may be, irrespective of whether the surge is unidirectional or oscillatory. It is also frequently desirable to measure the maximum value of the inrush oscillatory current surge to alternating current apparatus when they are first connected to their source. It, therefore, became desirable to provide a method of or an instrument for measuring the maximum value of a surge current irrespective of whether it is unidirectional or oscillatory.

My invention provides both the method and the instrument. Briefly described, my method consists of subjecting two magnetic bodies, each possessing a high degree of magnetic retentivity, to the magnetomotive force due to the current surge, subjecting each of these bodies during the surge to an additional magnetomotive force which is unidirectional and independent of the magnetomotive force due to the surge, these two additional magnetomotive forces being in opposite directions at every instant with respect to the surge magnetomotive force, and measuring the strength of the magnetic flux retained by each of these magnetic bodies after the surge is over. The flux retained by one of these magnetic bodies will be a function of the maximum value of the surge current irrespective of whether the surge was unidirectional or oscillatory. This retained flux is then measured by an instrument calibrated with the magnetic body whose flux is being measured and the result interpreted in terms of maximum surge current. By measuring the magnetic flux retained by each of the two magnetic bodies, it is readily possible to determine various characteristics of the surge current. Furthermore, the maximum value of certain types of surges may be determined by employing only one of these magnetic bodies and measuring the strength of the flux retained by it after the surge is over. For the sake of brevity, each of these magnetic bodies will be hereinafter called a magnetic pick-up element.

My invention, however, will be best understood from the following description, when considered in connection with the accompanying drawings, while those features of my invention which are believed to be novel and patentable are pointed out in the appended claims.

Fig. 1 of the drawings represents a perspective view of two magnetic pick-up elements adjacent a conductor through which a surge current may flow, each element being positioned between the polar ends of a magnet which subjects it during the surge to a unidirectional magnetomotive force in addition to the magnetomotive force it is subjected to due to the surge current. Fig. 2 graphically represents positive and negative unidirectional surge currents that may flow through the conductor shown in Fig. 1. Fig. 3 represents hysteresis loops of the pick-up elements shown in Fig. 1. Fig. 4 represents a perspective cross-sectional view of a preferred form of magnetic pick-up element and a perspective view of an instrument for measuring the strength of its retained magnetic flux. Fig. 5 graphically represents a portion of an oscillatory surge current that may flow through the conductor shown in Fig. 1. Fig. 6 represents a cross-sectional view of another form of magnetic pick-up element that may be used. Fig. 7 represents a modification of Fig. 1 showing each pick-up element surrounded by a direct current energized coil. Fig. 8 represents the essential parts of two instruments, such as shown in Fig. 4, and a magnetic pick-up element between the polar ends of a permanent magnet adjacent each instrument, all being positioned near a conductor through which a surge current may flow. Fig. 9 represents a perspective view of a ballistic galvanometer and how the same may be employed to measure the strength of the magnetic flux retained by a pick-up element after a surge. Similar parts in the various figures are represented by the same reference characters.

I will first describe how to measure the maximum value of a unidirectional surge current passing through conductor 10 in Fig. 1 by employing the magnetic pick-up element and instrument shown in Fig. 4. In Fig. 2 the curve OCDE represents a 1-5 microsecond surge current that may flow downwards, for example, through conductor 10 in Fig. 1, whereas the curve OC'D'E represents a similar surge current that may flow upwards through this conductor. For the sake of brevity, I will hereinafter call the surge OCDE a positive surge and the surge OC'D'E a negative surge. By a 1-5 microsecond surge, I mean a surge that rises from zero to its maximum value in 1 microsecond and then decreases to half its maximum value in 4 more microseconds, as shown in Fig. 2. The magnetic pick-up element shown in Fig. 4 is represented generally by 11 and consists of a plurality of strips 12 made of a magnetic material possessing a high degree of magnetic retentivity, these strips being preferably located inside of a hollow non-magnetic container 13 which is closed at one end and open at its opposite end. A pin 14, preferably of non-magnetic material, passes through container 13 near its open end. I prefer to make strips 12 out of cobalt steel because this material possesses a high degree of magnetic retentivity, but it should be understood that any material possessing this quality may be employed.

In Fig. 1, I have shown two elements 11 positioned at the same distance from conductor 10 so as to be subjected to the magnetomotive force in the space surrounding the conductor due to the current surge. The two elements 11 lie between the polar ends of two magnets 15 and 16, respectively, the magnets having substantially the same magnetomotive force and being so positioned that at every instant their magnetomotive forces are in opposite directions with respect to the surge magnetomotive force. The supporting means for the elements and magnets are not shown in order to simplify the drawings. To obtain consistent and accurate measurements, the magnetomotive force due to the surge current should not appreciably increase or decrease the magnetomotive force of either of magnets 15 and 16. This result may, for example, be obtained by positioning magnets 15 and 16 so that they are parallel to conductor 10, as shown, by making each magnet as long as practically feasible, and by making each magnet out of a material having a high coercive force, such as cobalt steel, for example. Now assume that a positive surge current flows through conductor 10, and that due to this surge there is a magnetomotive force in the space surrounding the conductor in the direction shown by the arrows on dot and dash line 17. It can be seen that during the surge the left-hand element 11 is subjected to two magnetomotive forces which are in the same direction, one due to the surge and the other due to magnet 15, whereas the right-hand element 11 is subjected to two magnetomotive forces which are in opposite directions, one due to the surge and the other due to magnet 16.

In Fig. 3, the abscissa OH represents magnetizing force and the ordinate OB represents magnetic flux, and OFG represents the virgin magnetization curve of a magnetic element 11. Curve GLMNG represents the hysteresis loop of a magnetic element 11 for a maximum flux value OP, whereas curve FRSTF represents the hysteresis loop of the element for a maximum flux value OU. Assume that OV represents the magnetizing force to which each element 11 in Fig. 1 is subjected by its magnet. Hence, OU represents the flux passing through each element before a surge current passes through conductor 10. The magnetomotive force due to the surge is at every instant substantially directly proportional to the surge current. Therefore, as the surge current rises from zero to its maximum value C and decreases to zero the resultant magnetomotive force to which the left-hand element 11 is subjected rises from OV to OH and then decreases back to OV, whereas the resultant magnetomotive force to which the right-hand element 11 is subjected decreases from OV to OX and then increases back to OV, VX being equal to VH. Consequently, during the surge the flux of left-hand element 11 rises from OU to OP and then decreases to OY, whereas the flux of right-hand element 11 decreases from OU to OZ and then increases back to OU. Elements 11 are now removed from the influence of their magnets, whereupon the magnetic flux retained by the left and right-hand elements will be represented by OL and OR, respectively. Since OR would have been the magnetic flux retained by each element had they been removed from the influence of their magnets before the surge, the effect of the latter was to increase the flux retained by the left-hand element without changing the flux retained by the right-hand element.

The magnetic flux retained by elements 11 after the unidirectional surge is over may be measured in any suitable manner and the result interpreted in terms of maximum surge current. I will first describe how this can be done by employing the instrument shown in Fig. 4. This instrument is represented generally by 18, and consists of a base 19 having integral therewith or secured thereto a vertical shelf 20, and a hollow cylindrically-shaped cover 21 removably secured by any means (not shown) to shelf 20; all being preferably made of non-magnetic material. Part of cover 21 is shown broken away to show the internal parts of the instrument. Cover 21 has a window 22, behind which is a graduated scale 23 secured to posts 24 carried by shelf 20. Scale 23 has a zero mark at approximately its center and similarly marked graduations on both sides of the zero mark. Secured to the inside of shelf 20 is a C-shaped bracket 25 in which is rotatably or pivotally mounted a small shaft 26. A small bar 27 of magnetic material is secured to shaft 26 with its longitudinal axis at a right angle to the axis of rotation of shaft 26. Bar 27 is preferably a permanent magnet, although this is not essential. Secured to shaft 26 is an indicating pointer 28 adapted to sweep over scale 23. Two oppositely wound spiral springs 29 are so arranged that rotation of shaft 26 in one direction is resisted by one spring and in the opposite direction by the other spring. On the back side of shelf 20 is a boss 30 having a hole 31 whose axis is substantially perpendicular to the axis of bar 27 when the latter is in its normally stationary position. The diameter and depth of hole 31 are such that an element 11 can be readily inserted therein and when this is done the element will extend approximately equal amounts above and below the axis of rotation of shaft 26. A stop-key represented by 32 consists of a handle 33 secured to a C-shaped strip 34 whose parallel legs are adapted to slide through two holes in the top of cover 21; one of these holes being represented by 35; and the other hole not being shown as it is in the broken away cover portion. The dimensions and shape of strip 34 are such that when it is lowered through holes 35, its ends will rest on bar 27 near its opposite ends, thereby preventing rotation of the bar in either direction. Strip 34 is preferably made of magnetic material so as to function as a magnetic armature for bar 27 if the latter is a permanent magnet, thus tending to prevent demagnetization of the latter when the instrument is not being used. The various parts of instrument 18 may be so arranged that its pointer 28 indicates zero when there is no pick-up element 11 in its hole 31, or it indicates zero when such an element has been removed from its position in Fig. 1 before a surge passed through conductor 10 and is inserted into hole 31. I will assume the latter to be the case.

After the unidirectional surge OCDE has passed through conductor 10, magnetic elements 11 are inserted one at a time into hole 31 of instrument 18, and the indication of pointer 28 noted. It is clear that when the right-hand element 11 is inserted into hole 31 the pointer will indicate zero, whereas when the left-hand element is inserted into the hole the pointer will indicate some value above zero. The extent of the pointer indication above zero will depend on the additional magnetic flux retained by the left-hand element 11 due to the surge and will, therefore, depend on the maximum value of the surge current which passed through conductor 10 in Fig. 1. Hence, by suitably calibrating the scale of instrument 18, as hereinafter described, the instrument pointer will indicate the maximum value of the unidirectional surge current OCDE.

It should now be clear that if a negative unidirectional surge, such as represented by OC′D′E′ in Fig. 2, passes through conductor 10 in Fig. 1, the direction of the surge magnetomotive force will be opposite to that shown by the arrows on dot and dash line 17; hence, during the surge the left-hand element 11 will be subjected to the resultant of two opposing magnetomotive forces, whereas the right-hand element 11 will be subjected to the resultant of two assisting magnetomotive forces. Consequently, when the left-hand element 11 is inserted in hole 31 of instrument 18 after the surge is over, the instrument pointer will indicate zero, whereas when the right-hand element 11 is inserted in this hole after the surge is over, the instrument pointer will indicate the maximum value of the surge current.

From the previous descriptions it should be obvious that if it were known that a positive unidirectional surge is to pass through conductor 10, then only the left-hand element 11 with its magnet need be employed as described to determine the maximum value of the surge current, and if, with element 11 so employed, a negative unidirectional surge current happened to pass through the conductor this would become known because the instrument pointer would indicate zero when the element is inserted into hole 31. In a similar manner, if it were known that a negative unidirectional surge is to pass through conductor 10, then only the right-hand element 11 with its magnet need be employed as described to determine the maximum value of the surge current, and if, with element 11 so employed, a positive unidirectional surge current happened to pass through the conductor; this would become known because the instrument pointer would indicate zero when the element is inserted into hole 31. If, however, it is not known whether a positive or negative unidirectional surge current is to flow through conductor 10, then both elements 11 with their magnets should be employed, as previously described, whereby the instrument pointer will indicate the maximum value of a positive surge current when the left-hand end element is inserted into hole 31 and will indicate the maximum value of a negative surge current when the right-hand element is inserted into hole 31. By determining in advance which element 11 will cause the instrument pointer to indicate the maximum surge current for a positive surge and which element 11 will do the same for a negative surge, as hereinafter described, it is possible to determine both the maximum value and direction of a unidirectional surge through conductor 10.

The above-mentioned advance determination and the calibration of the scale of instrument 18 may be carried out in the following manner: Two magnetic elements 11 with their magnets are arranged, as shown in Fig. 1. A positive unidirectional surge current of known maximum value is then sent through conductor 10. Elements 11 are then inserted one after another in hole 31 of instrument 18. With the elements and magnets arranged, as shown in Fig. 1, the instrument pointer will indicate zero when the right-hand element is inserted into hole 31, and the pointer will indicate above zero when the left-hand element is inserted into this hole. Scale 23 is then marked so that the pointer in its new position indicates this known maximum value of surge current. Furthermore, it is now known that if the instrument pointer indicates above zero when the left-hand element 11 is inserted into hole 31, the unidirectional surge must have passed down through conductor, whereas if the instrument pointer indicates above zero when the right-hand element 11 is inserted into hole 31, the unidirectional surge must have passed up through the conductor. The left-hand element is now demagnetized in any suitable manner and both elements replaced, as shown in Fig. 1. Another positive unidirectional surge is then sent through conductor 10 having a higher known maximum value than that of the previous surge. The left-hand element 11 is then inserted into hole 31 of the instrument and the scale suitably marked so that pointer 28 in its new position indicates the known maximum value of the second surge. This process is repeated until the entire scale is calibrated.

I also wish to point out that the magnitude of the magnetic flux retained by an element 11 at the end of a surge not only depends on the maximum value of the surge current, but also depends on several other factors, e. g., the thickness of its strips 12, the number of strips, their distance from conductor 10, and the time it takes the surge to reach its maximum value from zero value. During the surge the strips are threaded by a magnetic flux of varying intensity, hence eddy currents are caused to flow in the strips which tends to oppose their magnetization by this flux. All other factors being equal, the thinner the strips the smaller will be the eddy currents and the greater will be the magnetic flux retained by them at the end of the surge. By making strips 12 of thin material, e. g., .005" thick, the strips will retain sufficient magnetic flux to give a satisfactory measuring operation even with a very fast surge, e. g., a 1–5 microsecond surge. Furthermore, the strength of the magnetic flux retained by strips 12 at the end of a surge will then be substantially equal to that which they would retain if a steady direct current of the same value as the maximum value of the unidirectional surge passed through conductor 10. Since with a given maximum value of surge current the slower the surge the lower are the eddy currents flowing in the strips, it follows that the above will also be true with slower surges than a 1–5 microsecond surge. Hence, by employing strips 12 of suitable thickness, it is possible to have a magnetic pickup element whose retained flux at the end of a surge is substantially directly proportional to the maximum value of the surge current and is substantially independent of the time it takes the surge to reach its maximum value from zero.

Obviously, with slower surges than a 1–5 microsecond, it may be satisfactory to use thicker strips, in fact with very slow surges it may be satisfactory to use a solid piece, whereas with faster surges it may be necessary to use thinner strips or even a mass of very small particles, as shown in Fig. 6. The pick-up element shown in Fig. 6 is represented generally by 36 and consists of a mass of small particles 37 of a magnetic material possessing a high degree of magnetic retentivity, such as cobalt steel, inside of container 13.

Now assume that two elements 11 with their magnets are arranged, as shown in Fig. 1, and that an oscillatory surge current, for example, such as shown in Fig. 5, passes through conductor 10. Also assume that the maximum value of the surge occurs during the first alternation, that this maximum value is represented by C'', and that during the first alternation the current flows down through the conductor. As the surge rises from zero to its maximum value C'' the resultant magnetomotive force to which the left-hand element 11 is subjected rises from OV to OH in Fig. 3, and when the surge has decreased to zero, reversed and reached its maximum value in the second alternation, this magnetomotive force decreases to a value slightly greater than OX since the maximum current in the second alternation is below the value C'', and as the surge current continues to flow this magnetomotive force continues to oscillate between the limits OX and OH until at the end of the surge it again has the value OV. In the case of the right-hand element 11, however, as the surge rises from zero to its maximum value C'', the magnetomotive force to which this element is subjected decreases from OV to OX, and when the surge has decreased to zero, reversed and reached its maximum value in the second alternation, this magnetomotive force increases to some value between OV and OH since the maximum current in the second alternation is below the value C'', and as the surge current continues to flow this magnetomotive force continues to oscillate between the limits OX and OH until at the end of the surge it again has the value OV. Since the left-hand element 11 has been subjected during the surge to a maximum magnetomotive force represented by OH, it will, when removed from magnet 15, retain a magnetic flux represented by OL, whereas the right-hand element 11 will, when removed from its magnet 16, retain a magnetic flux whose value is less than OL because the maximum magnetomotive force it was subjected to during the surge was lower than OH. Hence, following such a surge, when the left-hand element 11 is inserted into hole 31 of instrument 18 the instrument pointer will give a larger indication than when the right-hand element 11 is placed in this hole. By suitably calibrating the instrument scale and determining in advance which element 11 produces the largest indication of the instrument pointer for a current flow in a given direction through conductor 10, in a manner similar to that described for a unidirectional surge, it is readily possible to determine the maximum value of the surge current, the maximum value of that alternation of the surge which has the second highest amplitude, and the direction in which the current flows through the conductor during each of these alternations. Furthermore, if it is only desired to determine the maximum current of an oscillatory surge and if it is known in which direction the current flows through conductor 10 during that alternation of the surge which has the maximum amplitude, then only one element 11 with its magnet need be employed, as for example the left-hand element with its magnet.

In Fig. 7 I have shown each element 11 surrounded by a coil 38 which is connected in series with an adjustable resistance 39 and a switch 40 to a battery 41. The directions and magnitudes of the direct currents sent through these coils are such as to produce within each element 11 substantially the same value of unidirectional magnetomotive force, the two magnetomotive forces, however, being in opposite directions. From this it will be clear that with this arrangement it is possible to obtain all the results described in connection with Fig. 1. In Fig. 7 the active portion of resistance 39 should be made as high as feasible in order to reduce to as low a value as possible the alternating current flowing through each coil 38 that is induced therein by the surge current flowing through conductor 10.

In many cases it is desirable to have some instrument or instruments permanently located adjacent a conductor through which a unidirectional or oscillatory surge may flow so as to indicate the maximum value of the surge current. This may be accomplished by placing two instruments 18 adjacent the conductor, each instrument having a magnetic pick-up element in its hole 31, and each element having some means associated therewith for subjecting it to a unidirectional magnetomotive force in addition to that due to the surge. Thus, for example, in Fig. 8 I have shown only the essential parts of two instruments 18, each instrument having a pick-up element 11 positioned between the polar ends of a magnet, all being placed adjacent a conductor 42. Magnets 15 and 16 are so arranged that their magnetomotive forces are in opposite directions. Before a surge current passes through conductor 42, bar 27 of each instrument will preferably be locked against rotation by using stop-key 32 (see Fig. 4) as previously described. After a surge current has passed through the conductor the stop-keys and magnets 15 and 16 are removed. From a previous description it will be clear that if a unidirectional surge passed through conductor 42 from left to right, one of the pointers 28 will indicate the maximum value of this surge, and if this surge was in the opposite direction the other pointer 28 will indicate its maximum value. Also, if an oscillatory surge passed through the conductor, one of the pointers 28 will indicate the maximum surge current, whereas the other pointer 28 will indicate the maximum current during that surge alternation which had the second highest amplitude.

In Fig. 9 I illustrate another form of apparatus for carrying out that part of my method which relates to the measuring of the magnitude of the magnetic flux retained by a pick-up element after a surge. This apparatus consists of a coil 43 having a hole 44, the coil being associated with a well-known form of ballistic galvanometer. The galvanometer consists of a stationary permanent magnet 45 having pole pieces of the shape and polarities shown, and an armature winding 46 on a drum 47 that is rotatably mounted between the pole pieces of the magnet. Drum 47 is suspended from a wire 48 which is secured at its upper end to a stationary adjustable screw 49. One end of a spring 50 is secured to the bottom of drum 47, and its other end is secured to a stationary adjustable screw 51. Wire 48 and spring 50 are also electrically connected to opposite ends of armature winding 46, thus connecting the latter in series with coil 43. A shunting resistance 52 is connected across coil 43. A stationary incandescent lamp 53 has a thin straight filament 54, the lamp being connected to a suitable energizing source (not shown). Light from this lamp falls on a suitable stationary lens 55 which focuses a narrow vertical ray of light onto a mirror 56 carried by wire 48, the mirror reflecting this ray of light onto a stationary ground glass graduated scale 57 of the zero-center type. By suitably adjusting screws 49 and 51, the ray of light reflected from mirror 56 can be made to fall on the zero mark of scale 57 when drum 47 is in its normally stationary position.

Any form of magnetic pick-up element may be tested in the ballistic galvanometer. For example, assume that it is desired to use element 11 for determining the maximum value of a unidirectional or oscillatory current surge that flowed through conductor 10 in Fig. 1. Two elements 11 with their magnets will be placed adjacent conductor 10, as shown in Fig. 1. After the surge is over the two elements will be inserted one at a time in hole 44 of coil 43, as shown in Fig. 9. The diameter of this hole is preferably such as to allow the body of the pick-up element to pass readily therethrough but not to permit pin 14 of the element to pass through. Element 11 should be so positioned in hole 44 that the lengths of its strips 12 protruding above and below the coil are substantially equal. This can be accomplished by suitably positioning an adjustable slide 58 on which element 11 rests. By pulling slide 58 in the direction shown by the arrow thereunder the element drops down through hole 44, thus causing a continually decreasing magnetic flux from the element to thread coil 43 until the element clears the hole. This induces a voltage in coil 43 which causes a current to flow through armature winding 46, thus causing drum 47 to rotate and the ray of light on scale 57 to move to one side or the other from its zero indicating position. The extent of movement of the ray of light on scale 57 from its zero-indicating position depends on the magnitude of the magnetic flux retained by element 11 at the end of the surge, and, therefore, depends on the maximum value of the surge current that flowed through conductor 10. It is clear that by suitably calibrating scale 57 in the manner described in connection with instrument 18, one of the elements 11 will, when tested as described, cause the ballistic galvanometer to indicate the maximum value of the surge current that flowed through conductor 10 irrespective of whether it was an oscillatory or unidirectional surge. Since element 11 will take practically the same time to drop down through hole 44 every time it is tested, the galvanometer will always accurately indicate the maximum value of the surge current. From the description given in connection with instrument 18, it is clear that by using the galvanometer it is also possible to determine the direction in which a unidirectional surge flows through a conductor, and the direction in which the current is flowing through that alternation of an oscillatory surge which has the maximum amplitude.

In accordance with the provisions of the patent statutes, I have described the principles of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:

1. Surge current measuring apparatus comprising a magnetic body possessing a high degree of magnetic retentivity and adapted to be so positioned adjacent a conducting body through which the surge current flows as to be subjected to the magnetomotive force in the space surrounding the conducting body due to this surge, means for subjecting said magnetic body during the current surge period to an additional magnetomotive force which is unidirectional and independent of the surge magnetomotive force, and means for measuring the magnitude of the magnetic flux retained by said magnetic body after the current surge is over.

2. Surge current measuring apparatus comprising a magnetic body possessing a high degree of magnetic retentivity and adapted to be so positioned adjacent a conducting body through which the surge current flows as to be subjected to the magnetomotive force in the space surrounding the conducting body due to this surge, a coil surrounding said magnetic body, means for energizing said coil with direct current during the surge current period, and means for measuring the magnitude of the magnetic flux retained by said magnetic body after the current surge is over.

3. Apparatus for measuring the maximum value of a unidirectional surge current that flowed through a conducting body, said apparatus comprising a magnetic body possessing a high degree of magnetic retentivity and adapted to be so positioned adjacent the conducting body as to be subjected to the magnetomotive force in the space surrounding the latter due to the current surge therethrough, means for subjecting said magnetic body during the current surge period to an additional unidirectional magnetomotive force which is independent of and in the same direction as the magnetomotive force due to this current surge, and means for measuring the magnitude of the magnetic flux retained by said magnetic body after the current surge is over.

4. Surge current measuring apparatus comprising two magnetic bodies each possessing a high degree of magnetic retentivity and each adapted to be so positioned adjacent a conducting body through which the surge current flows as to be subjected to the magnetomotive force in the space surrounding the conducting body due to this surge, means for subjecting each of said magnetic bodies during the current surge to an additional magnetomotive force which is unidirectional and independent of the surge magnetomotive force, said means being so arranged that the two additional magnetomotive forces are at every instant in opposite directions with respect to the surge magnetomotive force, and means for measuring the magnitude of the magnetic flux retained by each of said magnetic bodies after the current surge is over.

5. Surge current measuring apparatus comprising two magnetic bodies each possessing a high degree of magnetic retentivity and each adapted to be so positioned adjacent a conducting body through which the surge current flows as to be subjected to the magnetomotive force in the space surrounding the conducting body due to this surge, two coils respectively surrounding said magnetic bodies, means for so energizing said coils during the current surge period as to produce a unidirectional magnetomotive force within each magnetic body with these two magnetomotive forces being in opposite directions at every instant with respect to the surge magnetomotive force, and means for measuring the magnitude of the magnetic flux retained by each of said magnetic bodies after the current surge is over.

6. Surge current measuring apparatus comprising a stationary magnetic body possessing a high degree of magnetic retentivity and adapted to be so positioned adjacent a conducting body through which the surge current flows as to be subjected to the magnetomotive force in the space surrounding the conducting body due to this surge, a removably arranged stationary magnet positioned to subject said magnetic body to a unidirectional magnetomotive force during the current surge period, a movable magnetic member in a normally stationary position and adapted to be so placed adjacent said magnetic body that, after the removal of said magnet, the additional magnetic flux retained by the magnetic body due to a surge current effects a movement of the movable magnetic member from its normally stationary position to a different stationary position, and means operatively associated with said movable magnetic member for indicating the extent of its movement from its normal position.

7. Surge current measuring apparatus comprising two stationary magnetic bodies each possessing a high degree of magnetic retentivity and each adapted to be so positioned adjacent a conducting body through which the surge current flows as to be subjected to the magnetomotive force in the space surrounding the conducting body due to this current surge, a movable magnetic member in a normally stationary position and adapted to be so positioned adjacent one of said magnetic bodies that the magnetic flux retained by the latter after the current surge is over effects a movement of the movable magnetic member from its normally stationary position to a different stationary position, another movable magnetic member in a normally stationary position and adapted to be so positioned adjacent the other of said magnetic bodies that the magnetic flux retained by the latter after the current surge is over effects a movement of this movable magnetic member from its normally stationary position to a different stationary position, means for subjecting each of said magnetic bodies during the current surge to an additional magnetomotive force which is unidirectional and independent of the surge magnetomotive force, said means being so arranged that the two additional magnetomotive forces are in opposite directions at every instant with respect to the surge magnetomotive force, and means operatively associated with each movable magnetic member for indicating the extent of its movement from its normally stationary position.

8. Surge current measuring apparatus comprising two stationary magnetic bodies each possessing a high degree of magnetic retentivity and each adapted to be so positioned adjacent a conducting body through which the surge current flows as to be subjected to the magnetomotive force in the space surrounding the conducting body due to this current surge, two coils respectively surrounding said magnetic bodies, means for so energizing said coils during the current surge period as to produce a unidirectional magnetomotive force within each magnetic body with these two magnetomotive forces being in opposite directions at every instant with respect to the surge magnetomotive force, two movable magnetic members having normally stationary positions and adapted to be so respectively placed adjacent said magnetic bodies that the magnetic flux retained by one of these magnetic bodies after the current surge is over effects a movement of one of said magnetic members from its normally stationary position and the magnetic flux retained by the other of said magnetic bodies after the current surge is over effects a movement of the other of said magnetic members from its normally stationary position, and means operatively associated with each movable magnetic member for indicating the extent of its movement from its normal position.

9. The method of determining the maximum value of a unidirectional current surge that flowed through a conducting body, which comprises subjecting a magnetic body possessing a high degree of magnetic retentivity to the unidirectional magnetomotive force in the space surrounding the conducting body due to the current surge, subjecting the magnetic body during the current surge to an additional unidirectional magnetomotive force which is in the same direction as the magnetomotive force due to the current surge, and measuring the strength of the magnetic flux retained by the magnetic body after the current surge is over.

10. The method of determining in which direction a unidirectional current surge flowed through a conducting body, which comprises subjecting a magnetic body possessing a high degree of magnetic retentivity to the unidirectional magnetomotive force in the space surrounding the conducting body due to the current surge, subjecting the magnetic body during the current surge to an additional unidirectional magnetomotive force, and measuring the strength of the magnetic flux retained by the magnetic body after the current surge is over.

11. The method of determining the maximum value of an oscillatory current surge that flowed through a conducting body, which comprises subjecting a magnetic body possessing a high degree of magnetic retentivity to the oscillatory magnetomotive force in the space surrounding the conducting body due to the current surge, subjecting the magnetic body during the current surge to a unidirectional magnetomotive force which is in the same direction as the magnetomotive force due to that alteration of the surge which has the maximum amplitude, and measuring the strength of the magnetic flux retained by the magnetic body after the current surge is over.

12. The method of determining various characteristics of an electric current surge that flowed through a conducting body, which comprises subjecting two magnetic bodies each possessing a high degree of magnetic retentivity to the magnetomotive force in the space surrounding the conducting body due to the current surge, subjecting each magnetic body during the current surge to an additional magnetomotive force which is unidirectional and independent of the surge magnetomotive force, the two additional magnetomotive forces being in opposite directions at every instant with respect to the surge magnetomotive force, and measuring the strength of the magnetic flux retained by each magnetic body after the current surge is over.

RICHARD G. LORRAINE.

CERTIFICATE OF CORRECTION.

Patent No. 1,942,065.                                      January 2, 1934.

RICHARD G. LORRAINE.

It is hereby certified that error appears in the printed specification of the above numbered patent requiring correction as follows: Page 1, line 40, for "an" read a; page 7, line 90, claim 11, for "alteration" read alternation; and that the said Letters Patent should be read with these corrections therein that the same may conform to the record of the case in the Patent Office.

Signed and sealed this 30th day of January, A. D. 1934.

(Seal)
F. M. Hopkins
Acting Commissioner of Patents.